(12) United States Patent
Asakura et al.

(10) Patent No.: US 6,639,747 B2
(45) Date of Patent: *Oct. 28, 2003

(54) SIGNAL RECORDING AND REPRODUCING METHOD AND SIGNAL RECORDING AND REPRODUCING UNIT

(75) Inventors: Hiroyuki Asakura, Kanagawa (JP); Hideaki Kondo, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/365,949

(22) Filed: Aug. 2, 1999

(65) Prior Publication Data

US 2003/0095352 A1 May 22, 2003

(30) Foreign Application Priority Data

Aug. 3, 1998 (JP) .......................................... 10-219281

(51) Int. Cl.[7] .......................... G11B 15/12; G11B 15/14; G11B 15/04; G11B 5/02
(52) U.S. Cl. .............................. 360/62; 360/64; 360/18; 360/60; 386/63; 386/96
(58) Field of Search .............................. 360/57, 60, 61, 360/62, 18, 22, 64, 66; 386/52, 63, 46, 56, 95, 96

(56) References Cited

U.S. PATENT DOCUMENTS

| 4,743,985 | A | * | 5/1988 | Shibata et al. ................. 360/61 |
| 4,757,408 | A | * | 7/1988 | Umeda ......................... 360/64 |
| 4,843,491 | A | * | 6/1989 | Otokawa .................. 360/73.07 |
| 5,299,072 | A | * | 3/1994 | Gotoh et al. .............. 360/66 X |
| 5,519,544 | A | * | 5/1996 | Hara ........................... 360/22 |
| 5,585,973 | A | * | 12/1996 | Kim ........................... 386/67 |
| 5,953,172 | A | * | 9/1999 | Nakamura et al. ............ 360/64 |

* cited by examiner

Primary Examiner—Andrew L. Sniezek
(74) Attorney, Agent, or Firm—Frommer Lawrence & Haug LLP; William S. Frommer; Bruno Polito

(57) ABSTRACT

The present invention relates to a signal recording and reproducing method used for video tape recorder. An erasing position precedes a recording position and a reproducing position precedes the erasing position. By using a period when reproducing does not reproduce a signal recorded on a track of a tape-like storage medium, the period occurring during recording and reproducing operation, recording apparatus records a signal on a recording track or erasing apparatus erases a signal recorded on a recording track. Hereby, if a signal recorded on a recording track of the tape-like storage medium is processed and replaced, the signal recorded on the recording track of the tape-like storage medium can be satisfactorily reproduced without being influenced by signal recording operation and signal erasing operation.

8 Claims, 9 Drawing Sheets

US 6,639,747 B2

SIGNAL RECORDING AND REPRODUCING METHOD AND SIGNAL RECORDING AND REPRODUCING UNIT

BACKGROUND OF THE INVENTION

1. Field of the Invention

The present invention relates generally to a signal recording and reproducing method and a signal recording and reproducing unit. More particularly, the present invention relates to a signal recording and reproducing method and a signal recording and reproducing unit wherein a member such as a rotating drum is provided with reproducing means, erasing means and recording means; an erasing position precedes a recording position and a reproducing position precedes the erasing position; and recording means records a signal on one track of a tape-like storage medium or erasing means erases a signal recorded on one track of the tape-like storage medium, in doing a recording and a reproduction in multiple mode, when the reproducing means does not reproduce a signal recorded on the one track.

2. Description of the Related Art

In a conventional video tape recorder, a rotating drum is provided with a recording head and a reproducing head, whereby the recording head can record a signal on a tape and the reproducing head can reproduce a signal recorded on the tape. Also, the conventional video tape recorder can reproduce a signal recorded on a tape by the reproducing head, and process the reproduced signal to record the processed signal on the tape again by the recording head. Further, the conventional video tape recorder can record a signal, for example, the one supplied from an external device, while reproducing a signal recorded on the tape.

A rotating drum 100 of the above conventional video tape recorder is provided with two reproducing heads 101re, 101ro and two recording heads 102we and 102wo as illustratively shown in FIG. 1. The two reproducing heads 101re, 101ro are 180 degrees apart from each other and the two recording heads 102we, 102wo are also 180 degrees apart from each other. These respective recording heads 102we, 102wo are 90 degrees apart from the reproducing heads 101re, 101ro. Each head records or reproduces a signal during a period in which the rotating drum 100 is rotated approximately by 180° with heads running on a tape.

When reproducing operation in which a signal recorded on a tape is reproduced using a rotating drum 100 shown in FIG. 1 and recording operation in which a signal is recorded on the tape using the rotating drum 100 are executed simultaneously in multiple mode, the reproducing head 101re reproduces a data signal such as an audio signal and a video signal recorded on a track "K" of a tape for a period from time t41 to time t43 as shown in FIG. 2.

Each word in parentheses shown in FIG. 2 indicates a head located on a track and each word in parentheses in FIG. 4 described later also similarly indicates a head located on a track.

At time t42 when the rotating drum 100 is rotated by 90° from its position that the reproducing head 101re starts reproducing a data signal at the time t41, the recording head 102we starts recording a new data signal on a track, for example, "K−1".

Next, at time t44 when the rotating drum 100 is rotated by 180° from its position that the reproducing head 101re starts reproducing a signal at the time t41, the reproducing head 101ro starts reproducing a data signal on a track "K+1".

Further, at time t45 when the rotating drum 100 is rotated by 270° from its position that the reproducing head 101re starts reproducing a data signal at the time t41, the recording head 102wo starts recording a new data signal on the track K. At time t46, the rotating drum 100 is rotated once.

The level of a reproduced signal acquired when the tape is reproduced by the reproducing heads 101re, 101ro is lower than that of a recording signal supplied to the recording heads 102we, 102wo. Therefore, when reproducing operation mode and recording operation mode are simultaneously executed for a period, for example, from the time t42 to the time t43, the reproduced signal is influenced by the recording signal.

Alternatively, in a video tape recorder for which high reliability is required, an erasure is executed using an erasing head before a signal is recorded so that said video tape recorder can guard against an effect of a signal which is not correctly recorded and is left on a tape.

In such a video tape recorder, as shown in FIG. 3, a rotating drum 200 is provided with two reproducing heads 201re and 201ro, which are close to each other, and two recording heads 202we, 202wo. The recording heads 202we, 202wo are 180 degrees apart from the respective reproducing heads 201re and 201ro.

As an erasing head 203 cannot be positioned on any positions of the reproducing heads 201re, 201ro and the recording heads 202we, 202wo in the current technology, the erasing head 203 is positioned between the reproducing head 201ro and the recording head 202we.

FIG. 4 shows operations of heads in the video tape recorder wherein the rotating drum 200 provided with the reproducing heads 201re, 201ro, the recording heads 202we, 202wo and the erasing head 203 as shown in FIG. 3 is used. For a period from time t51 to time t55, the reproducing head 201re reproduces a data signal recorded on a track "K". Further, for a period from time t52 to time t57, the reproducing head 201ro reproduces a data signal recorded on a track "K+1".

At time t53 when the rotating drum 200 is rotated by a predetermined angle θ from its position that the reproducing head 201re starts reproducing a data signal at the time t51, the erasing head 203 is located on track(s), for example, "K−1" and "K−2". In a household digital VTR format for example, the erasing head 203 erases an audio signal and a video signal respectively recorded after an insert and track information (ITI) sector (an area in which information related to its track and others are recorded) for a period from time t54 to time t59.

At time t56 when the rotating drum 200 is rotated by 180° from its position that the reproducing head 201re starts reproducing a data signal at the time t51, recording head 202we records a new data signal on a track, for example, "K−4". At time t58, the recording head 202wo records a new data signal on a track "K−3" and at time t60, the rotating drum 200 is rotated once.

The level of a reproduced signal acquired when a tape is reproduced by the reproducing head 201r is lower than that of an erasing signal supplied to the erasing head 203. Therefore, as described above, when erasing operation is executed during reproducing operation, that is, when reproducing operation and erasing operation are simultaneously executed for a period from the time t54 to the time t57, even if reproducing operation and recording operation are executed in different periods, the reproduced signal is influenced by the erasing signal.

SUMMARY OF THE INVENTION

The object of the present invention is to provide a signal recording and reproducing method and a signal recording and reproducing unit wherein a recorded signal can be satisfactorily reproduced even if signal reproducing operation, signal recording operation and signal erasing operation are executed simultaneously in multiple mode.

In carrying out the invention in one preferred embodiment, we provide a signal recording and reproducing unit for recording a series of signals on a tape-like storage medium running on, for reproducing the series of signals recorded on the tape-like storage medium and for erasing the series of signals recorded on the tape-like storage medium. Said signal recording and reproducing unit comprises a rotating drum, recording means for forming a recording track on the tape like storage medium running on and for recording the series of signals on the track, erasing means for erasing a series of signals recorded on a recording track preceding the recording track formed by the recording means, reproducing means for reproducing a series of signals recorded on a recording track preceding the recording track erased by the erasing means, and the control means for controlling recording operation of the recording means, erasing operation of the erasing means and reproducing operation of the reproducing means. The rotating drum is provided with a recording head, an erasing head and a reproducing head. The control means allows the reproducing means to execute reproducing operation. Further, the control means allows the recording means and the erasing means to execute the recording operation and the erasing operation for a period that the reproducing head does not reproduce the series of signals recorded on the recording track, the period occurring during the reproducing operation of the reproducing means. The control means allows the recording means or the erasing means to execute the recording operation or the erasing operation for a period that the reproducing head does not reproduce the series of signals recorded on the recording track.

Also, as another preferred embodiment, we provide a signal recording and reproducing method of recording a series of signals on a tape-like storage medium running on, reproducing the series of signals recorded on said tape-like storage medium and erasing the series of signals recorded on the tape-like storage medium.

The signal recording and reproducing method comprises the steps of forming a recording track on the tape-like storage medium running on, and recording the series of signals on the recording track, by a recording head provided on a rotating drum; erasing a series of signals recorded on a recording track preceding the recording track formed in recording, by an erasing head provided on said rotating drum; and reproducing a series of signals recorded on a recording track preceding the recording track erased by the erasing means, by a reproducing head provided on said rotating drum.

The recording head and the erasing head executes the recording operation and the erasing operation for a period that said reproducing head does not reproduce said series of signals recorded on the recording track, said period occurring during the reproducing operation of said reproducing means.

The recording head or the erasing head executes the recording operation or the erasing operation for a period that said reproducing head does not reproduce said series of signals recorded on the recording track.

In the present invention, a rotating drum may be provided with plural recording head or plural erasing head. The rotating drum is provided with the erasing head so that its erasing position precedes a recorded position by the recording head. The rotating drum is provided with the reproducing head so that its reproducing position precedes the erasing position.

A recording signal and an erasing signal are simultaneously supplied to plural recording heads and plural erasing head and then a signal is recorded on one track and a signal recorded on one track is erased. Further, plural recording heads are arranged so that an area of a track on which one recording head records a signal and an area of a track on which another recording head records a signal have an overlapped part. Alternatively, plural erasing heads are provided so that an area of a track in which a signal is erased by one erasing head and an area of a track in which a signal is erased by another erasing head have an overlapped part.

A further understanding of the nature and advantages of the invention may be realized by reference to the following portions of the specification and drawings.

BRIEF DESCRIPTION OF THE DRAWINGS

FIGS. 6A and 6B are views each showing positions of heads in the video tape recorder of an embodiment of the present invention and a relationship between the heads and the tape-like storage medium running on;

DESCRIPTION OF THE PREFERRED EMODIMENTS

Figure 1:
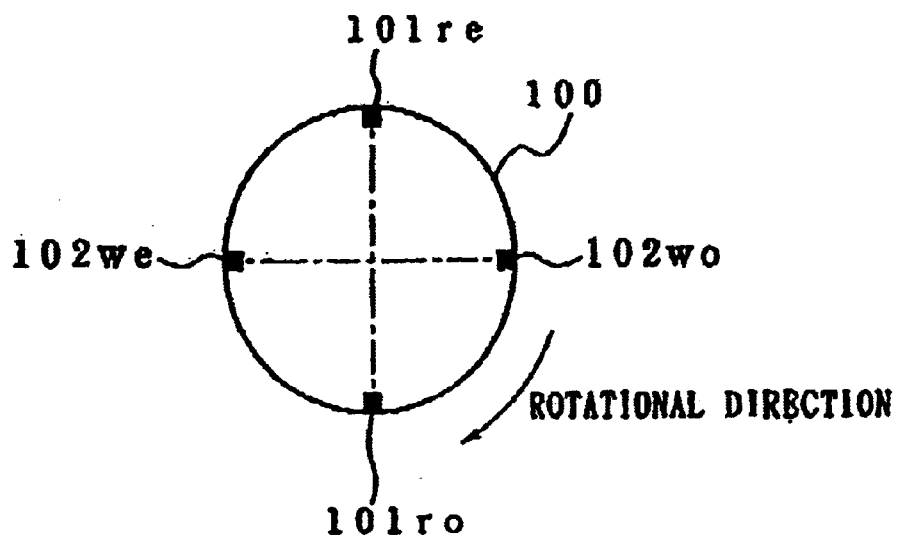
FIG. 1 is a view showing positions of heads arranged on a rotating drum relating to the related art.
Figure 3:
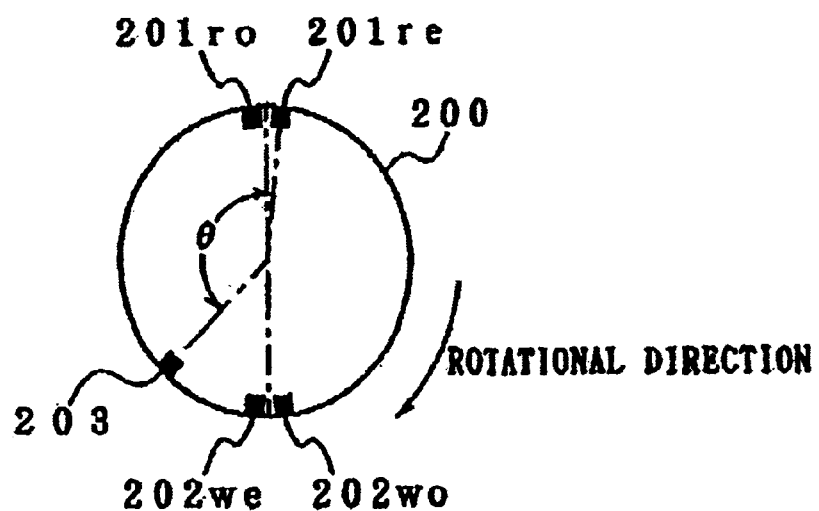
FIG. 3 is a view showing positions of heads in the video tape recorder wherein an erasing head is provided relating to the related art.
Figure 2:
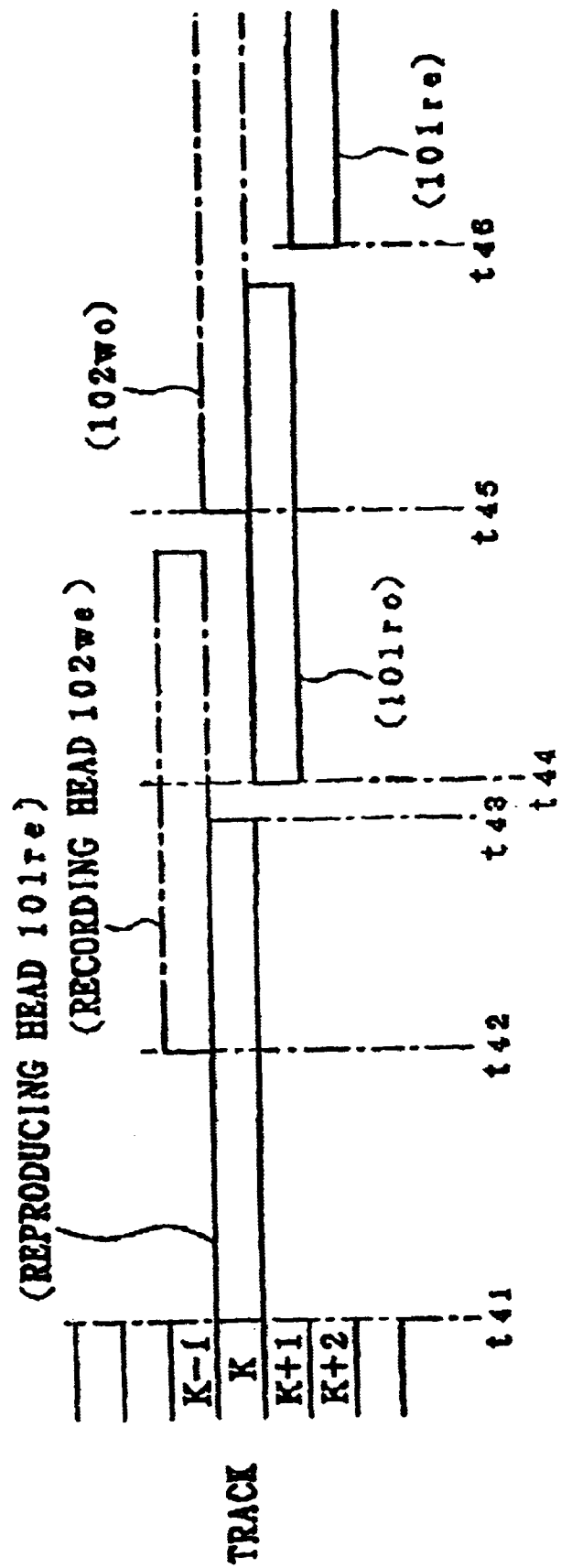
FIG. 2 is an illustration explaining the operations of heads in FIG. 1.
Figure 4:
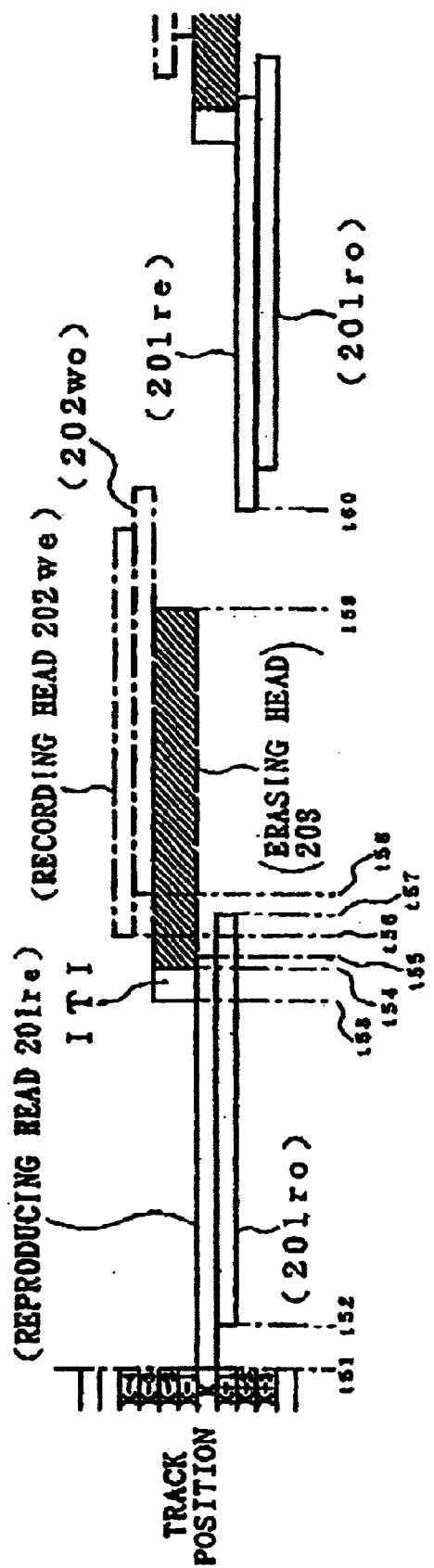
FIG. 4 is an illustration explaining the operations of heads in FIG. 3.

Referring to the drawings, preferred embodiments of the present invention will be described below.

Figure 5:
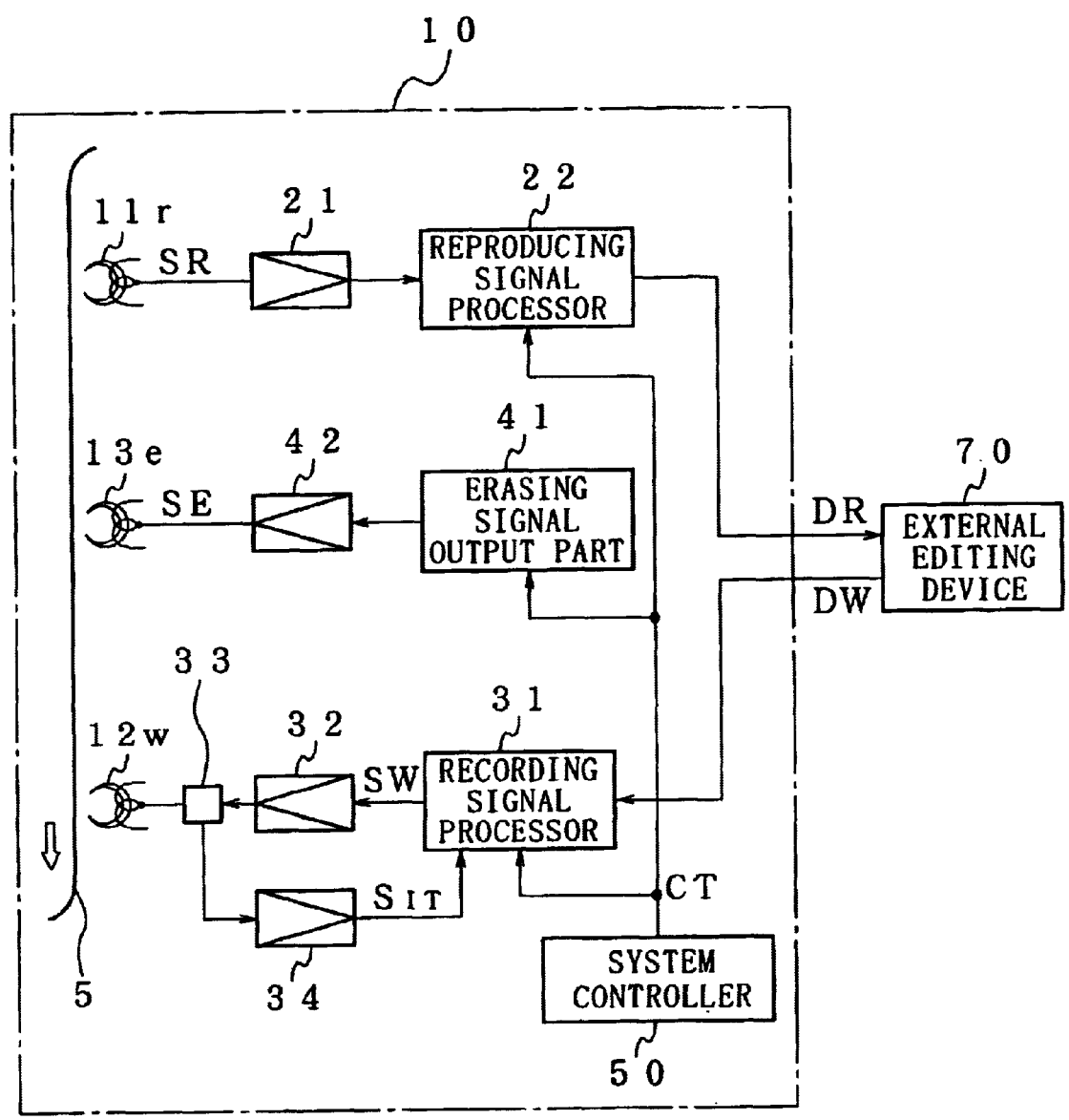
FIG. 5 is a view showing the configuration of a video tape recorder according to a preferred embodiment of the invention.

FIG. 5 shows the configuration of a signal recording and reproducing unit such as a video tape recorder. A rotating drum (not shown) is provided with a reproducing head 11$r$ and a recording head 12$w$ of a video tape recorder 10. The reproducing head 11$r$ precedes the recording head 12$w$ by predetermined tracks.

The reproducing head 11$r$ reproduces a series of signals recorded on a tilted track (hereinafter called only a track) of a tape 5. A reproduced signal SR thus acquired by the reproducing head 11$r$ is supplied to a reproducing signal processor 22 via an amplifier 21.

The reproducing signal processor 22 converts the reproduced signal SR to a digital signal. In a household digital VTR format, video data, audio data and subcode data are separated from the digital signal. An error correction processing is also performed on the digital signal. Further, the expansion processing and others are performed on video data. The video data thus acquired is supplied to an external editing device 70 together with audio data and others as a reproduced data signal DR. A system controller 50 described later controls the operations of the reproducing signal processor 22 according to a control signal CT transferred therefrom.

The external editing device 70 applies to the reproduced data signal DR, various processing such as inserting an image or character into another image based upon video data recorded on a tape, adding narration and BGM to sounds based upon audio data recorded on the tape and replacing sounds on either channel with new sounds. Video data and audio data respectively to which such processing is applied are supplied to a recording signal processor 31 of the video tape recorder 10 as a recorded data signal DW.

The recording signal processor 31 performs the compression processing on video data, which is a recorded data signal DW. The recording signal processor 31 adds an error correction code to video data, audio data, subcode data and others and generates a digital signal. Further, channel coding processing is applied to the digital signal and a recording signal SW is generated.

The recording signal SW is supplied to the recording head 12w via an amplifier 32 and a signal changeover switch 33 so that the recorded data signal DW is recorded.

The recording head 12w not only records a signal but also reproduces the ITI (Insert and Track Information) sector described later. A signal SIT acquired by reproducing the ITI sector is supplied to the recording signal processor 31 via the signal changeover switch 33 and an amplifier 34.

The recording signal processor 31 controls timing for the recording signal SW to be supplied to the recording head 12w based upon the signal SIT. Therefore, audio data, video data and others are correctly recorded in a predetermined area on the track in after-recording. The system controller 50 also controls the operations of the recording signal processor 31 according to a control signal CT transferred therefrom.

If a data signal recorded on the tape 5 is processed while reproducing it and the processed signal is recorded on the tape 5 again, the video tape recorder 10 performs the compression processing and the expansion processing on video data and the external editing device 70 executes the processing of data. Therefore, the reproducing head 11r and the recording head 12w are provided so that a reproducing position and a recording position are separated by time required for these processing. A data signal recorded on the tape 5 can be processed to be a new data signal.

An erasing head 13e is arranged between the reproducing head 11r and the recording head 12w so that the data signal after processing can be correctly recorded when the data signal is recorded again after it has been reproduced and processed. An erasing signal output part 41 is connected to the erasing head 13e. The erasing signal output part 41 supplies an erasing signal SE to the erasing head 13e via the amplifier 42 and then the erasing head 13e erases a data signal recorded on the tape 5.

The system controller 50 controls the operations of the erasing signal output part 41 according to a control signal CT transferred therefrom.

The system controller 50 controls the operation of each of the reproducing signal processor 22, the recording signal processor 31 and the erasing signal output part 41 by generating the above control signals CT and supplying said control signals CT to them. The system controller 50 also controls the driving of the tape 5.

Figure 6A:
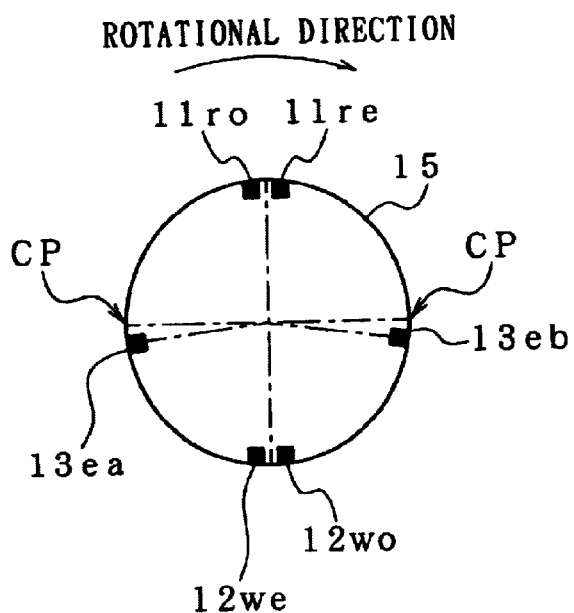

FIG. 6A is a top view showing a rotating drum 15 providing with the reproducing heads 11re, 11ro, the recording heads 12we, 12wo, and the erasing heads 13ea, 12eb. Two reproducing heads 11re, 11ro are provided close to each other and two recording heads 12we, 12wo are provided so that they are 180 degrees apart from the respective reproducing heads 11re and 11ro. The erasing heads 13ea and 13eb cannot be positioned in the positions of the reproducing heads 11re, 11ro and the recording heads 12we, 12wo. Therefore, they respectively are provided shifted a little on the side of the recording heads 12we, 12wo from central positions CP, CP between the reproducing head 11re and the recording head 12we and between the reproducing head 11ro and the recording head 12wo.

Figure 6B:
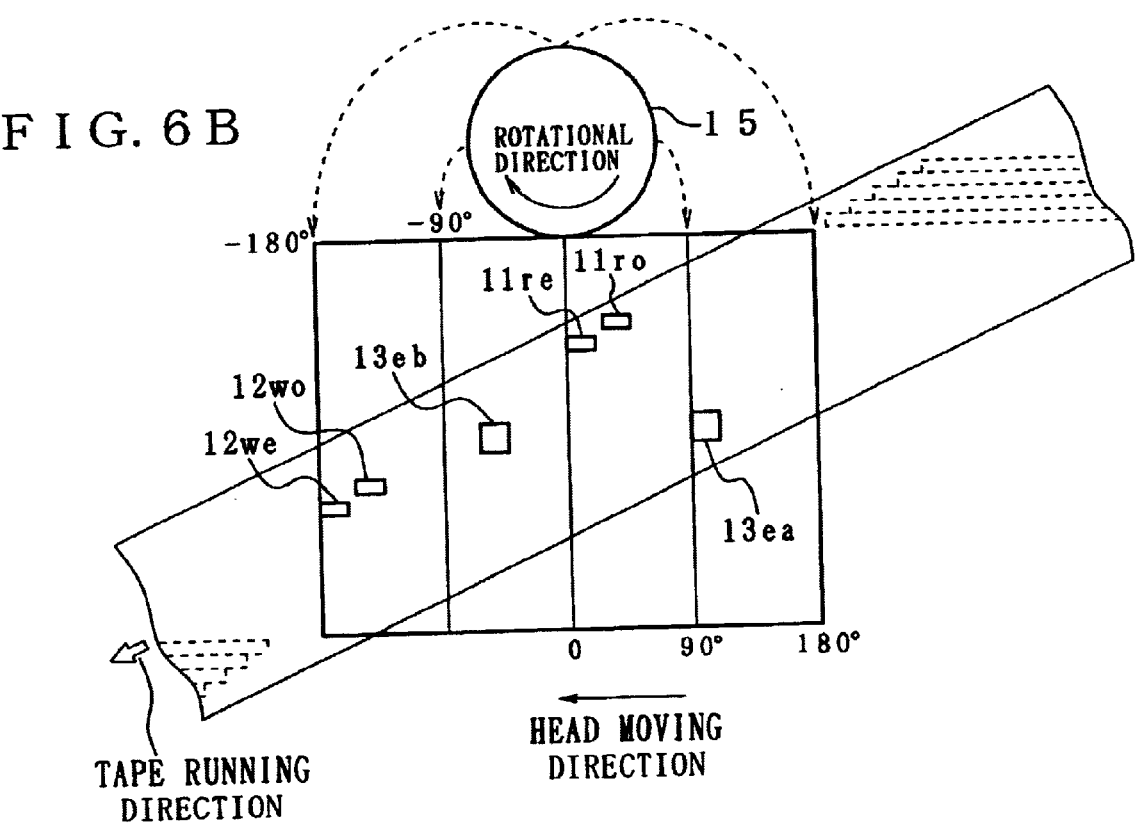

FIG. 6B shows the positions of each of the heads arranged on the rotating drum 15 in relation to the developed rotating drum 15. In FIG. 6B, the position of the reproducing head 11re is used as a criterion.

As the reproducing heads 11re and 11ro run on tracks of the tape 5 when the tape 5 is run and the rotating drum 15 is rotated, the reproducing heads 11re and 11ro can reproduce a data signal recorded on the tracks of the tape 5. Afterward, as the erasing heads 13ea and 13eb run on the tracks that a data signal is reproduced by the reproducing heads 11re and 11ro, the erasing heads 13ea and 13eb can erase the data signals recorded on the tracks. Further, as the recording heads 12we and 12wo run on tracks that a data signal is erased, the recording heads 12we and 12wo can record a new data signal on the tracks.

Figure 7:
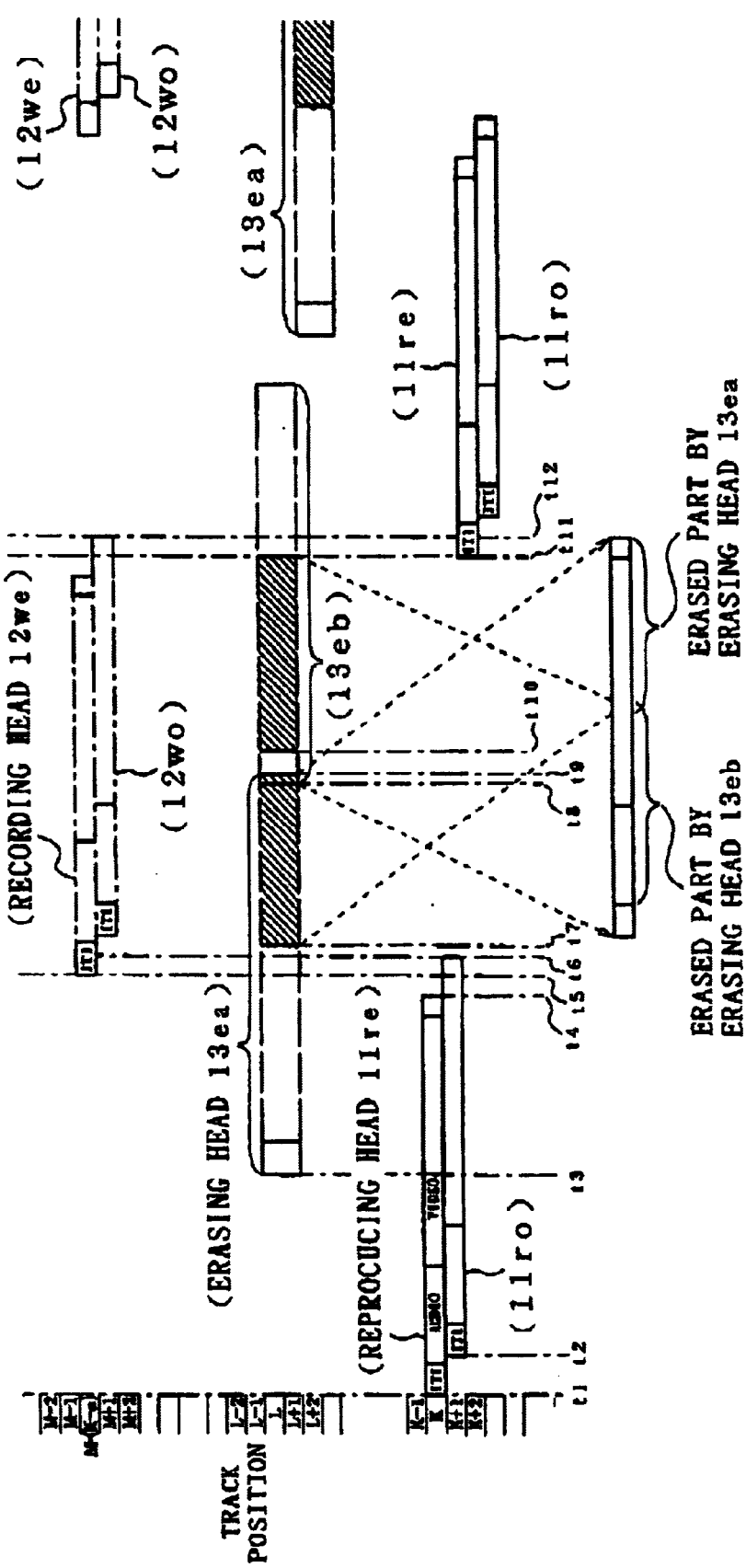
FIG. 7 is an illustration explaining operations of heads in FIG. 6A.

Next, referring to FIG. 7, the operations of the heads as shown in FIG. 6A will be described. For a period from time t1 to time t4 while the rotating drum 15 is rotated, the reproducing head 11re reproduces a data signal recorded on a track "K". For a period from time t2 to time t6, the reproducing head 11ro also reproduces a data signal recorded on a track "K+1".

Each word in parentheses shown in FIG. 7 indicates a head located on a track and each word in parentheses shown in FIG. 10 described later similarly indicates a head located on a track, A track of the tape 5 includes ITI sector, an audio sector, a video sector and a subcode sector. In the ITI sector, the information of a track such as track pitch, the information of data structure and others, and a reference signal for enhancing the precision of a recorded position in after-recording and others are recorded. Therefore, the information in the ITI sector is not changed even when a data signal recorded on a track is replaced with a new data signal. When every data signal recorded on the tape 5 is recorded again, the information in the ITI sector is erased and is newly recorded.

In the audio sector, audio data and data pertaining to it are recorded. In the video sector, compressed video data and data pertaining to it are recorded. In the subcode sector, an absolute track number, index information, a time code and others are recorded. A gap, not shown, is provided between the sectors to prevent a signal in each sector from being damaged by mistake by the misregistration of a recorded position in after-recording and others.

At time t3 when the rotating drum 15 is rotated by a little more angles than 90 degrees apart from its location at the time t1, the erasing head 13ea runs on a track "L" and a track "L+1". The track "L" is older than the track "K" and means a track already reproduced by the reproducing heads 11re, 11ro, for example.

At the time t4, the reproduction of a data signal recorded on the track "K" by the reproducing head 11re is completed. At time t5 when the rotating drum 15 is rotated by 180° from its location at the time t1, the recording head 12we is located on a track "M".

The above track "M" is older than the track K. The number a of tracks from the track "K" to the track "M" is set based upon time required for the expansion processing of a reproduced data signal, the processing of the expanded data signal by the external editing device 70 and the compression processing of the processed data signal and others. The number a of tracks can be replaced with new data by processing a data signal recorded on the tape 5.

As such a new data signal is recorded in the audio sector or the video sector after the ITI sector, a recording signal SW is timed to be supplied to the recording head 12we later than the time t6. At the time t6, the reproduction of the track "K+1" by the reproducing head 11ro is completed.

At subsequent time t7, the erasing signal output part 41 supplies an erasing signal SE to the erasing head 13ea. The erasing head 13ea erases a data signal on two tracks of the track "L" and the track "L+1" on the way of the tracks.

The erasing heads 13ea and 13eb are arranged a little shifted on the side of the recording heads 12we, 12wo, as shown in FIG. 6A. Therefore, at time t8 before time t9 when the erasing head 13ea is separated from the track "L" and the track "L+1", the erasing head 13eb is located on two tracks of the track "L" and the track "L+1". Afterward, at time t10, the erasing signal output part 41 supplies an erasing signal SE to the erasing head 13eb. The erasing head 13eb erases a data signal recorded on two tracks of the track "L" and the track "L+1".

Figure 8:
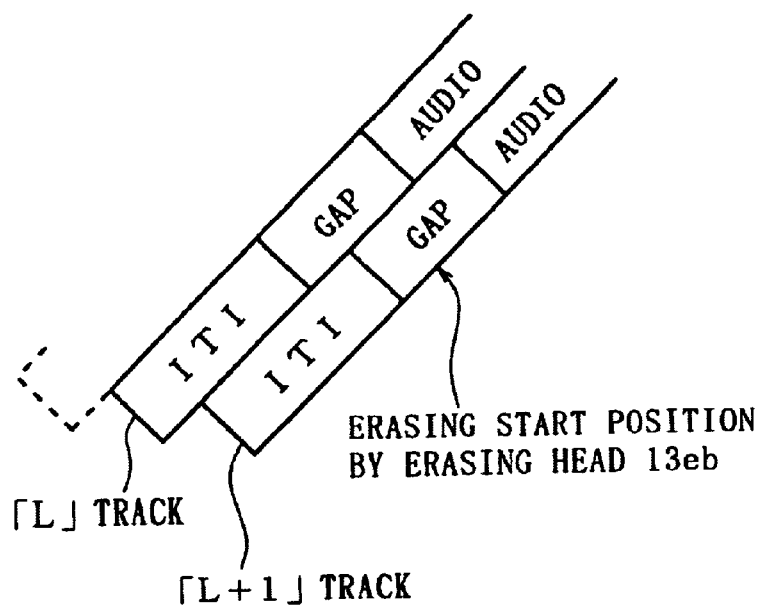
FIG. 8 is an illustration showing an erasing start position.

The timing of the time t10 when an erasing signal SE is supplied to the erasing head 13eb is equivalent to timing when the erasing head 13eb is located on gaps located between the ITI sectors and the audio sectors on two tracks of the track "L" and the track "L+1" as shown in FIG. 8. Therefore, this prevents a signal in the ITI sector from being erased and a signal in the audio sector succeeding the ITI sector can be erased from the head.

As the erasing heads 13ea, 13eb are arranged respectively a little shifted on the side of the recording heads 12we, 12wo, an area erased by the erasing head 13ea and an area erased by the erasing head 13eb can be overlapped in the center of a track. Therefore, even if erased positions disperse, this prevents a data signal from being left without being erased in the center of the track.

Afterward, when the rotating drum 15 is rotated once at time t11, the reproducing head 11re starts reproducing a data signal recorded on a track "K+2", At the same time, the supply of an erasing signal SE to the erasing head 13eb is stopped and erasing operation is finished.

Also, the recording head 12wo finishes recording a data signal at time t12. At this time, the reproducing head 11re is located on an ITI sector of a track "K+3" and the reproduction of a data signal such as audio data, video data and subcode data is not yet started.

Similarly, the supply of a recording signal SW to the recording heads 12we, 12wo and the supply of an erasing signal SE to the erasing heads 13ea, 13eb are not performed while a data signal such as audio data, video data and subcode data recorded on a track of the tape 5 is reproduced by the reproducing heads 11re and 11ro. Therefore, a reproduced signal SR is not influenced by a recording signal SW or an erasing signal SE even if signal recording operation is executed during signal reproducing operation. When the rotating drum 15 is miniaturized, a satisfactory reproduced signal SR can be acquired.

In the above embodiment, one track is erased using two erasing heads 13ea, 13eb. However, one track may be also erased using three or more erasing heads. Further, plural recording heads are provided and a data signal may be also recorded on one track using them.

Figure 9:
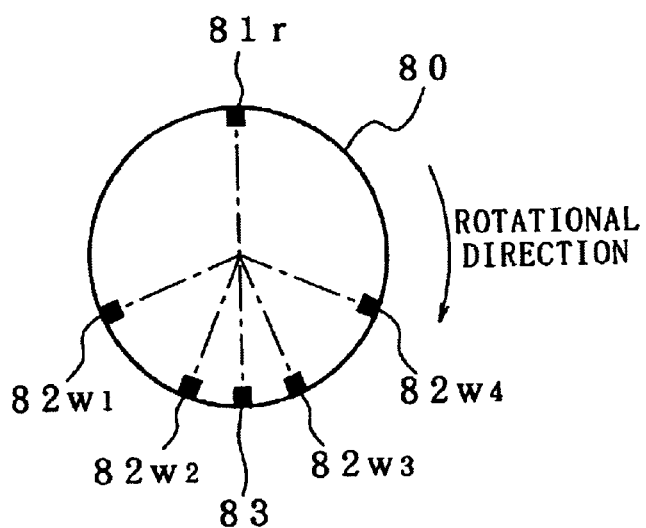
FIG. 9 is a view showing positions of heads in the video tape recorder of another embodiment of the present invention.

FIG. 9 shows a rotating drum 80 providing with, for example, four recording heads 82w1 to 82w4. The four recording heads 82w1 to 82w4 are arranged on the rotating drum 80 approximately at an angle of 45° apart from each other. An erasing head 83 is arranged in the center of the recording head 82w2 and the recording head 82w3. A reproducing head 81r is arranged so as to be 180 degrees apart from the erasing head 83.

Figure 10:
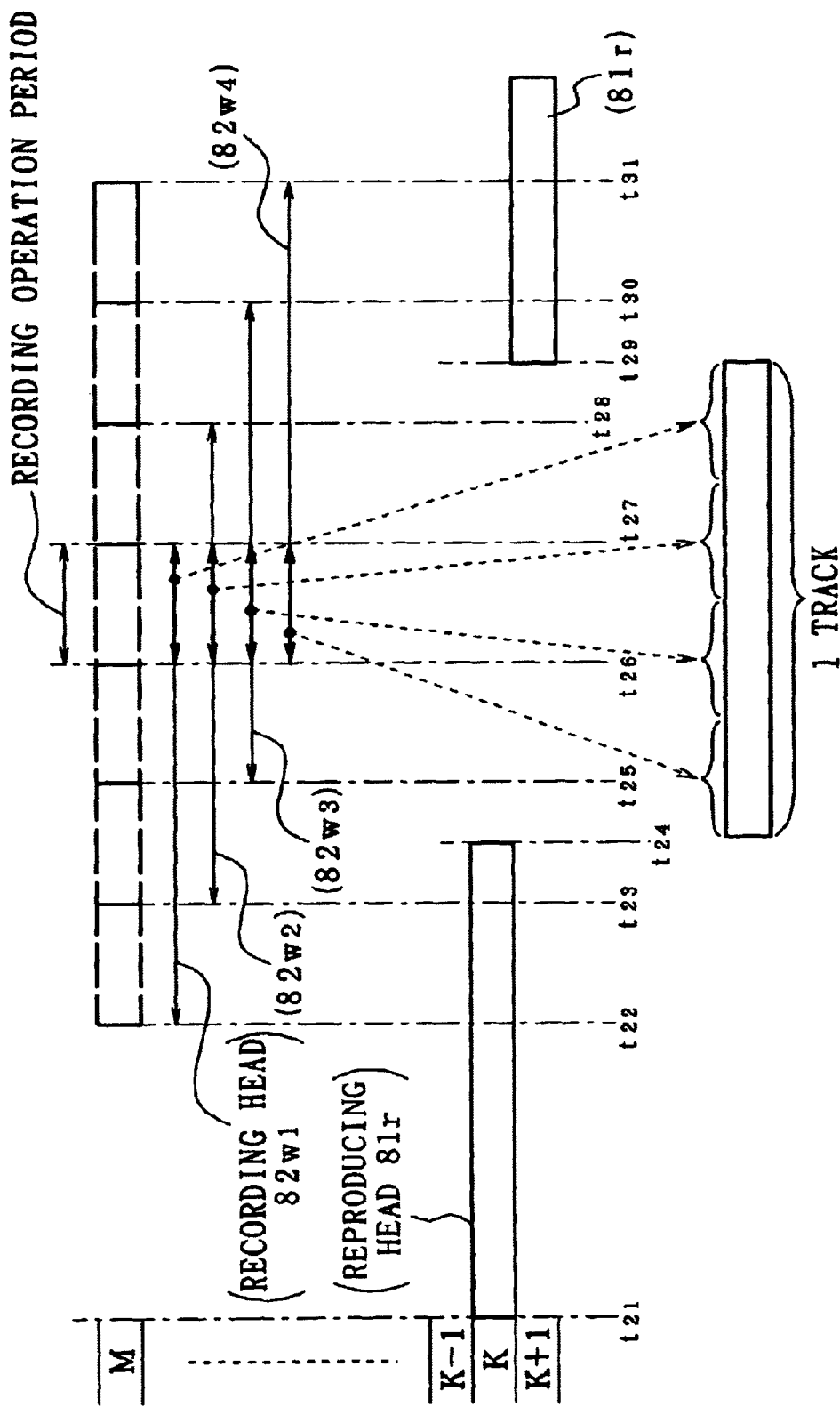
FIG. 10 is an illustration explaining operations of heads in FIG. 9.

FIG. 10 shows the operations of heads when the rotating drum 80 of FIG. 9 is used. For a period from time t21 to time t24 when the rotating drum 80 is rotated, the reproducing head 81r reproduces a data signal recorded on the track "K".

The recording head 82w1 is located on the track "M" for a period from time t22 to t27. The recording head 82w2 is located on the track "M" in a period prom time t23 to time t28. The recording head 82w3 is located on the track "M" in a period from time t25 to time t30. The recording head 82w4 is located on the track "M" in a period from time t26 to time t31.

A period from the time that the rotating drum 80 is rotated approximately by 180° from its location at the time t21 to the time that the rotating drum 80 is rotated once, that is, a period from the time t24 to time t29, is the period that a signal recorded on the tape is not reproduced. In a period when all the four recording heads 82w1 to 82w4 are located on the track "M" during the period from the time t24 to the time t29, that is, in a period from the time t26 to the time t27, a recording signal is simultaneously supplied to the recording heads 82w1 to 82w4. The four recording heads 82w1 to 82w4 records a track of data signal.

Figure 11:
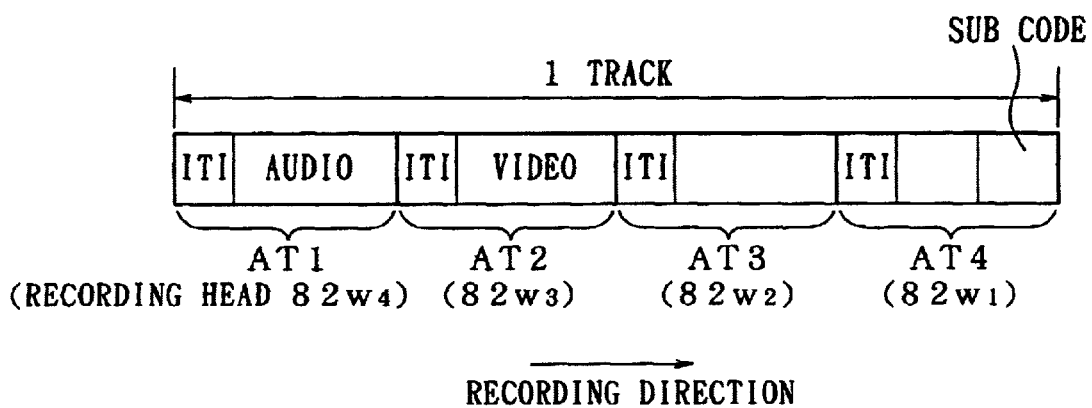
FIG. 11 is a view showing the configuration of a track.

FIG. 11 shows a track when the recording heads 82w1 to 82w4 are used. In an area AT1 of the track, a data signal is recorded by the recording head 82w4. In an area AT2 of the track, a data signal is recorded by the recording head 82w3. In an area AT3 of the track, a data signal is recorded by the recording head 82w2. In an area AT4 of the track, a data signal is recorded by the recording head 82w1. In each of these areas AT1 to AT4, an ITI sector is provided. Respective recording heads record audio data, video data and others correctly on a predetermined area by utilizing a signal recorded on each ITI sector.

Afterward, at the time t29 when the rotating drum 80 is rotated once from its location at the time t21 as shown in FIG. 10, the reproducing head 81r starts reproducing a data signal recorded on the track "K+1". For a period, not shown, when a signal recorded on the tape is not reproduced, the erasing head 83 erases a signal recorded on the tape.

As described above, for a period when a signal recorded on the tape is not reproduced, plural recording heads record a data signal correctly on a track. Also, simultaneous recording of a data signal on a track by using plural recording heads causes a reduction of a period when a recording signal is supplied to the recording heads. Therefore, this securely prevents a reproduced signal from being influenced by a recording signal.

When an interval between the four recording heads 82w1 to 82w4 is reduced so that an angle formed by them is smaller than 45 degrees to extend a period when the four recording heads 82w1 to 82w4 are located on the track M and then a period when a data signal is recorded is extended, areas in which a signal is recorded by each recording head can be overlapped. Thus, a signal recorded in an ITI sector can be correctly read even if recorded positions disperse. Therefore, the audio data, the video data and others can be correctly recorded on a predetermined area.

It need scarcely be said that plural erasing heads may be provided in the same way as the recording heads 82w1 to 82w4, and an erasing signal is simultaneously supplied to each erasing head so that each of the erasing heads erases a signal on a track.

As described above, according to the above embodiment, the recording of a signal by the recording head and the erasure of a signal by the erasing head are not performed during a period that the reproducing head reproduces a signal recorded on a track of the tape when signal recording operation and signal reproducing operation are simultaneously executed. Further, for a period when a signal recorded on a track is not reproduced, the plural recording heads record a signal or the plural erasing heads erase it. This brings about a satisfactory reproduced signal, and then a signal can be correctly recorded and an unnecessary signal can be securely erased without influencing a reproduced signal, In the above embodiment, a data signal such as audio data and video data, recorded on a tilted track of the tape by the video tape recorder is replaced, while processing the data signal. However, the signal recording and reproducing unit is not limited to the video tape recorder and the reproduced or recorded data signal is also not limited to a data signal such as audio data and video data recorded on the tilted track.

According to the present invention, an erasing position precedes a recorded position and a reproducing position precedes the erasing position. Further, for a period when the reproducing means does not reproduce a signal recorded on a track of the tape-like storage medium during recording operation and reproducing operation, the recording means records a signal on a recording track or the erasing means erases a signal recorded on a recording track. Therefore, when a signal recorded on a recording track of the tape-like storage medium is processed and replaced, the reproducing head may reproduce a signal recorded on a recording track of the tape-like storage medium satisfactorily without influenced by the recording operation of a signal and the erasing operation of a signal.

In the invention, plural recording means or plural erasing means can record or erase a signal simultaneously. Therefore, as a period required for recording or erasing a signal can be reduced, a signal recorded on the tape-like storage medium can be readily reproduced without being influenced by recording operation and erasing operation.

Further, as areas that each of the plural recording means records a signal are overlapped or areas that each of the plural erasing means erases a signal are overlapped, a signal can be correctly recorded or erased even if recorded positions or erased positions disperse.

While the above is a complete description of the preferred embodiments of the invention, various alternatives, modifications and equivalents may be used. Therefore, the above description should not be taken as limiting the scope of the invention as defined by the appended claims.

What is claimed is:

1. A signal recording and reproducing unit for recording a series of signals on a tape-like storage medium running, for reproducing said series of signals recorded on said tape-like storage medium and for erasing said series of signals recorded on the tape-like storage medium, comprising:
    a rotating drum;
    recording means for forming a recording track on said tape-like storage medium running and for recording said series of signals on the track, said recording means including a recording head provided on said rotating drum;
    erasing means for erasing a series of signals recorded on a recording track preceding said recording track formed by said recording means, said erasing means including an erasing head provided on said rotating drum;
    reproducing means for reproducing a series of signals recorded on a recording track preceding the recording rack erased by said erasing means, said reproducing means including a reproducing head provided on said rotating drum; and
    control means for controlling recording operation of said recording means, erasing operation of said erasing means and reproducing operation of said reproducing means to respectively perform at least one recording operation, at least one erasing operation and at least one reproducing operation for each rotation of said drum, such that no recording and no erasing are performed at the same time that reproducing is performed.

2. A signal recording and reproducing unit according to claim 1, wherein said recording means includes plural recording heads, said plural recording heads being arranged so that a record area formed by one of said plural recording heads and a record area formed by recording head other than said one recording head are overlapped.

3. A signal recording and reproducing unit according to claim 1, wherein said erasing means includes plural erasing heads, said plural erasing heads being arranged so that an area erasing by one of said plural erasing heads and an area erased by erasing head other than said one erasing head are overlapped.

4. A signal recording and reproducing unit according to claim 1, wherein said recording means and said erasing means respectively include plural recording heads and plural erasing heads;
    wherein said plural recording heads are arranged so that a record area formed by one of said plural recording heads and a record area formed by recording head other than said one recording head are overlapped; and
    wherein said plural erasing heads are arranged so that an area erasing by one of said plural erasing heads and an area erased by erasing head other than said one erasing head are overlapped.

5. A signal recording and reproducing method of recording a series of signals on a tape-like storage medium running, reproducing said series of signals recorded on said tape-like storage medium and erasing said series of signals recorded on said tape-like storage medium, comprising steps of:
    forming a recording track on said tape-like storage medium running, and recording said series of signals on the recording track, by a recording head provided on a rotating drum;
    erasing a series of signals recorded on a recording track preceding said recording track formed in recording, by an erasing head provided on said rotating drum; and
    reproducing a series of signals recorded on a recording track preceding the recording track erased by said erasing head, by a reproducing head provided on said rotating drum;

wherein said recording head, said erasing head and said reproducing head respectively perform at least one recording operation, at least one erasing operation and at least one reproducing operation for each rotation of said drum, such that no recording and no erasing are performed at the same time that reproducing is performed.

6. A signal recording and reproducing method according to claim 5, comprising further steps of providing a recording means including plural recording heads; and executing the recording so that a record area formed by one of said plural recording heads and a record area formed by recording head other than said one recording head are overlapped.

7. A signal recording and reproducing method according to claim 5, comprising further steps of providing an erasing means including plural erasing heads; and executing the erasure so that an area erased by one of said plural erasing heads and an area erased by erasing head other than said one erasing head are overlapped.

8. A signal recording and reproducing method according to claim 5, comprising further steps of providing a recording means including plural recording heads, and an erasing means including plural erasing heads;

executing the recording so that a record area formed by one of said plural recording heads and a record area formed by recording head other than said one recording head are overlapped; and executing the erasure so that an area erased by one of said plural erasing heads and an area erased by erasing head other than said one erasing head are overlapped.

\* \* \* \* \*